(12) United States Patent
Hurst et al.

(10) Patent No.: US 7,224,805 B2
(45) Date of Patent: May 29, 2007

(54) CONSUMPTION OF CONTENT

(75) Inventors: Leon Hurst, Helsinki (FI); Julian Durand, Mountain View, CA (US); Jeffrey Miles Wilkinson, Wellesley Hills, MA (US); Mulligan Michael, Tampere (FI)

(73) Assignee: Nokia Corporation, Espoo (FI)

( * ) Notice: Subject to any disclaimer, the term of this patent is extended or adjusted under 35 U.S.C. 154(b) by 901 days.

(21) Appl. No.: 10/029,349

(22) Filed: Dec. 28, 2001

(65) Prior Publication Data

US 2003/0007646 A1    Jan. 9, 2003

Related U.S. Application Data

(60) Provisional application No. 60/314,095, filed on Aug. 23, 2001.

(30) Foreign Application Priority Data

Jul. 6, 2001    (GB)    ................... 0116489.6

(51) Int. Cl.
*H04L 9/00*    (2006.01)
(52) U.S. Cl. .................. 380/285; 713/171; 380/277
(58) Field of Classification Search .................. 380/285
See application file for complete search history.

(56) References Cited

U.S. PATENT DOCUMENTS 4,683,553 A    7/1987    Mollier
5,557,518 A *  9/1996    Rosen ........................... 705/69
6,282,650 B1 * 8/2001    Davis ........................... 713/176
6,438,690 B1 * 8/2002    Patel et al. .................. 713/156
6,868,160 B1 * 3/2005    Raji ............................. 380/30
6,891,953 B1 * 5/2005    DeMello et al. ............ 380/277

FOREIGN PATENT DOCUMENTS

| EP | 0 613 073 A1 | 8/1994 |
|---|---|---|
| EP | 0 679 980 A1 | 11/1995 |
| EP | 0 766 165 A2 | 4/1997 |
| EP | 1 076 279 A1 | 2/2001 |
| WO | WO 00/54127 A1 | 9/2000 |
| WO | WO 00/58810 A2 | 10/2000 |
| WO | WO 00/58811 A2 | 10/2000 |
| WO | WO 00/59151 A2 | 10/2000 |
| WO | WO 01/46783 A2 | 6/2001 |

* cited by examiner

*Primary Examiner*—Kambiz Zand
*Assistant Examiner*—Aubrey H. Wyszynski
(74) *Attorney, Agent, or Firm*—Banner & Witcoff, Ltd.

(57) ABSTRACT

A method and apparatus for consumption of content (1) is described in which a licensor is able to exercise control over consumption based on a personal identity in the form of a set of binding attributes (15). The control may be exercised for a number of consuming terminals (19) including rendering machines such as portable video and audio players.

26 Claims, 9 Drawing Sheets

CONSUMPTION OF CONTENT

CROSS REFERENCE TO RELATED APPLICATION

This application claims the benefit of the filing date of Provisional Application Ser. No. 60/314,095, filed on Aug. 23, 2001, entitled "Improvements in and Relating to Consumption of Content" which is incorporated herein by reference in its entirety.

BACKGROUND OF THE INVENTION

1. Field of the Invention

The present invention relates to the consumption of content, particularly although not exclusively the distribution, rendering and decryption of content having digital rights such as copyright therein.

2. Description of the Prior Art

Typically, content such as video, audio or textual data is consumed by a user via a terminal such as a rendering machine. A rendering machine transforms the data defining the content into a form which may be interpreted by a user's senses. Thus, content in the form of video may be rendered on a visual display unit or monitor, audio content may be rendered by a stereo system and a printer used to render textual content, to name but a few examples. In many cases, such as the distribution of content recorded on magnetic media, optical disk or the like, a number of steps will take place in rendering the data to a form suitable for interpretation by a user's senses.

With the advent of digital content distribution, the opportunity has arisen for faultless replication of content to be carried out. Clearly, without appropriate controls, such replication or copying can take place without the agreement of a content relevant right's holder/owner. A particular challenge to the content generating community, which includes record companies, publishers and other right holders, is the ease with which digital content may be disseminated, particularly over networks. This ease of dissemination is also coupled with the fact that there is little or no degradation in the quality of the content despite repeated copying and forwarding of the content in its original format. Thus, unauthorized copies of copyrighted content will meet the same high expectations of consumers in relation to the authorized content.

Consequently, many approaches have been implemented and are being developed to protect such content for rendering on a particular rendering machine. A particularly favored approach (FIG. 3) is to provide each rendering machine 2 with a globally unique tamperproof identity 4 and to incorporate a Digital Rights Management (DRM) engine 6 into the device 2. Subsequently, content stored in encrypted form on the device 2 may be unlocked only where license conditions, including a requirement to confirm that the globally unique identity 4 of the device 2 matches a set of binding attributes in the license, are met.

SUMMARY OF THE INVENTION

According to one aspect of the present invention, there is provided a method of decrypting content stored on a terminal, the method comprising obtaining a license comprising a content decryption key and a set of binding attributes, the attributes including a public key; establishing a communication link between the terminals; receiving digitally signed data on the communication link at the terminal from the one other terminal; verifying at the terminal the digitally signed data utilizing the said public key; and wherein the terminal in response to verification of the digitally signed data using the content decryption key to decrypt the content.

By binding content to a consumer identity, preferably in the form of an asymmetric key-pair, with a private key held in a Personal Trusted Device (PTD) of the user, the content is no longer bound to a particular terminal such as a rendering machine. As a result, the consumer is able to enjoy content in any suitable rendering machine wherever the consumer is able to prove the consumer's identity through the presence of the consumer's personal trusted device or more particularly through the presence of the consumer's private key on a secure tamperproof security element accessible to a protected processing environment (PPE) of the consumer's personal trusted device. Such a PPE provides functions including the ability to digitally sign data e.g. text, for the purposes of authentication. The choice of whether to use symmetric or asymmetric encryption techniques to protect the content, and any associated business rules or other conditions relating to the content, is dependent upon not only on the preferences of the rights holder, but also on technical considerations relating to security, ease and/or speed of encryption/decryption, key distribution and the like. Indeed, a hybrid approach may be taken in which both asymmetric and symmetric encryption schemes are adopted to encrypt content, business rules and other conditions relevant thereto.

According to a further aspect of the present invention, there is provided a terminal for rendering encrypted content, comprising a storage for the encrypted content and a license containing a content decryption key and a set of binding attributes, the attributes including a public key; a protected processing environment; a personal area network interface which establishes a communication link between the terminal and at least one other terminal and which delivers digitally signed data received from the other terminal to the protected processing environment; and wherein upon successful verification of the digitally signed data using the public key, the protected processing environment decrypts the encrypted content using the content decryption key.

Conveniently, the protected processing environment includes a digital rights management engine operable in accordance with the set of binding attributes.

According to a still further aspect of the present invention, there is provided a license creation method for facilitating the decryption of content on a terminal, the method comprising appending a set of binding attributes to a content decryption key wherein the binding attributes include a public key certificate obtained from a repository holding a public key certificate of a licensee with a corresponding private key being held on another terminal.

The license creation method is most conveniently under the control of the content provider or a party authorized thereby. Thus, the content provider should be able to verify the identity of those customers to whom the content provider provides access to encrypted content in the form of a license. Such verification of identity may be carried out by authenticating those certificates obtained from the repository with the relevant certification authority.

The public key certificate may be stored at the terminal or alternatively access to the public key certificate may be obtained by the terminal by storing a URL at the terminal, which is an alias to a network address at which the public key certificate may be retrieved by the terminal for rendering the content. The use of the URL decreases the storage requirements for data at the terminal significantly. Consequently, the URL at which the public key certificate may be retrieved may be stored in the terminal so that the terminal merely fetches the public key certificate when necessary.

The content provider is able to assess a level of trust in each customer based on the results of verification of the digital signature and the nature of the certification authority. This level of trust may be utilized by the content provider in determining what rights, if any, should be given in the license. Such rights may conveniently be stored in a voucher attached to the license or alternatively the content.

Whether a voucher is attached or otherwise delivered with the content or license, the DRM engine of a terminal is able to parse the voucher and act in accordance with any restrictions set by the content provider or owner in terms of the granted rights. The content or license is locked unless the right voucher is available.

The license may include a plurality of binding attributes which may allow content to be rendered by corresponding user identities. In which case, the content provider may establish different conditions to the rendering of the content as parsed from a corresponding voucher by a DRM engine of a terminal. Different user or device specific conditions, e.g. preferences or profiles may be established.

Although the license may only be delivered to a user on payment of a fee for example, advantageously, it may only be utilized to access content provided the relevant binding attributes can be satisfied, namely through the above described mechanism. Consequently, the license is freely transferable over a network or indeed on any insecure channel.

The invention further is a method of distributing encrypted content to a terminal comprising delivering encrypted content and a license relating thereto to a terminal, the license containing binding attributes corresponding to a user identity, and requesting authentication of the attributes by a personal trusted device.

It will be apparent that the personal trusted device may be utilized to authenticate the attributes of a license regardless of the particular platform on which the content is to be rendered, provided the requisite communication can be established. The rendering device and trusted device can be different which allows a free roaming voucher to be utilized.

A terminal which renders encrypted content in accordance with the invention includes a storage for the encrypted content and a license, the license containing a content decryption key and a set of binding attributes, the attributes including a public key; a protected processing environment; a communication link between the terminal and at least one other terminal which delivers digitally signed data from the other terminal to the terminal; a digital rights management engine disposed in a non-secure part of the terminal; and a digital rights management agent disposed within the protected processing environment which verifies if the digitally signed data is signed by a licensee of the encrypted content and upon verification, uses the content decryption key to decrypt the encrypted content. The storage may be unprotected; and the digital rights management engine may decrypt the set of binding attributes to determine if the encrypted content is licensed to be decrypted and if the encrypted content is authorized to be decrypted signals the digital rights management engine to render the content. The personal area network interface may issue a request to the other terminal to provide the digitally signed data. An encrypted part of the license may include a user identity certificate issued and digitally signed by a certification authority which permits a licensor of the content to establish a level of trust in a licensee of the content. An encrypted part of the license may include a URL which is an address at which a user identity certificate was issued and a digitally signed by a certification authority may be obtained which permits a licensor of the content to establish a level of trust in a licensee of the content.

BRIEF DESCRIPTION OF THE DRAWINGS

In order to understand more fully the present invention particular embodiments thereof are now be described by way of example and with reference to the accompanying drawings, in which.

Like reference numerals identify like parts throughout the drawings.

DETAILED DESCRIPTION OF THE PREFERRED EMBODIMENTS OF THE INVENTION

Figure 1:
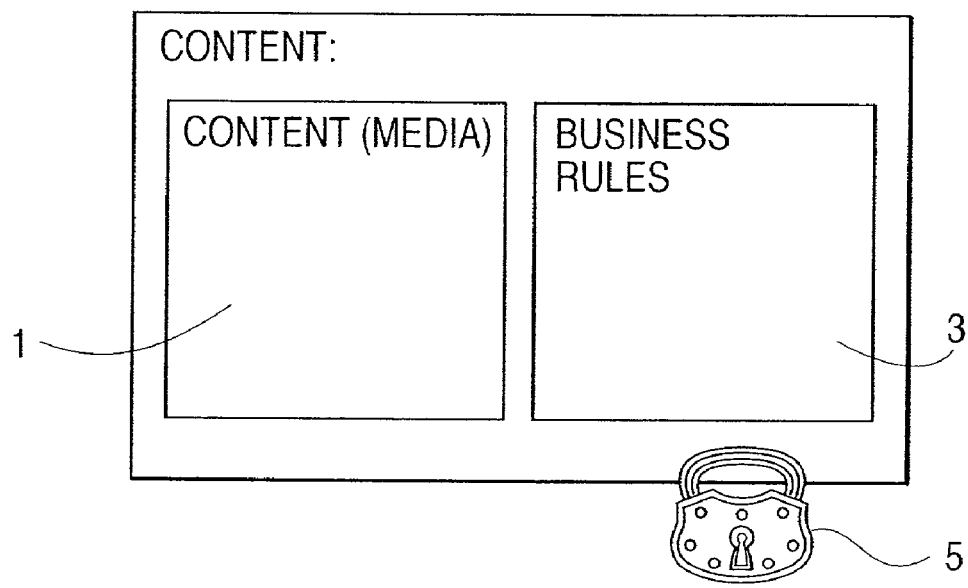
FIG. 1 is a diagrammatic representation of encrypted content and associated attributes or business rules helpful for use in understanding the present invention.

Referring to FIG. 1, content 1 for delivery to a terminal, hereinafter referred to as a rendering machine is, in this case, packaged together with a voucher 3 defining a set of conditions, (e.g. business rules) applying to the rendering of that content 1. By way of example, the conditions may describe the technical requirements for rendering the content 1 and/or additional data such as copyright and distribution rights information. The entire package of content and metadata (data about data) is protected against unauthorized access by a symmetric encryption key 5. Typically, the strength of the symmetric encryption technology is at least 128 bits and a suitable symmetric encryption algorithm may be without limitation that set out in the Advanced Encryption Standard (AES) draft proposal for a Federal Information Processing Standard (FIPS) dated Feb. 28, 2001 which is incorporated herein by reference in its entirety.

Figure 2:
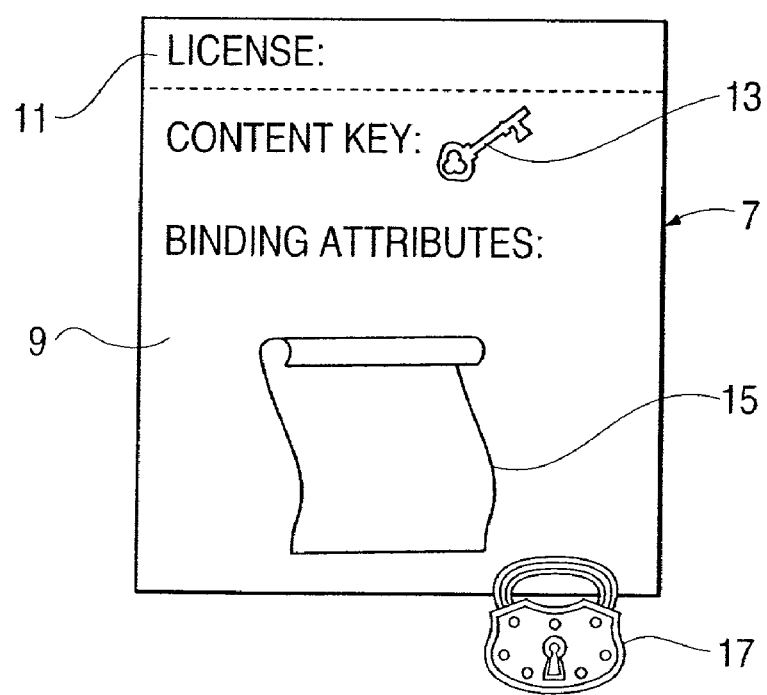
FIG. 2 is a diagrammatic representation of an encrypted license in accordance with one aspect of the present invention.
Figure 3:
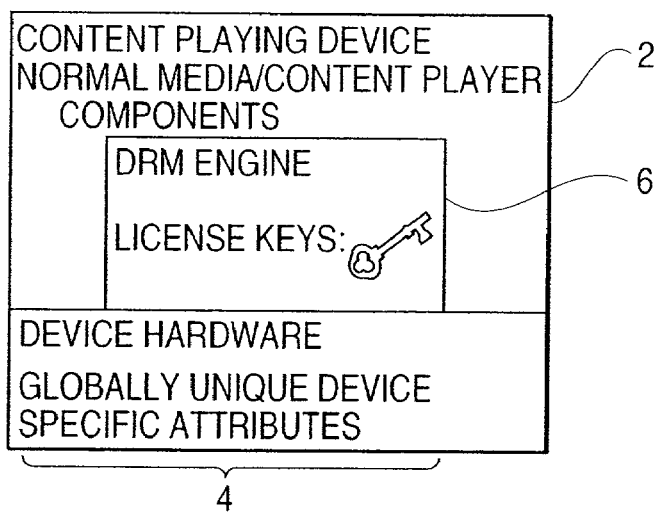
FIG. 3 is a schematic view of a prior art content rendering system.

As illustrated in FIG. 2, in addition to packaging the content 1 securely, the content owner or a party authorized thereby, generates a license 7 pertaining to that content. In particular, the license 7 comprises encrypted 9 and unencrypted 11 portions. The unencrypted portion 11, which identifies the licensee, incorporates additional data identifying the content 1 to which it relates. Because this metadata is unencrypted, the metadata is visible to external services required to manipulate the license and the corresponding content such as those services provided by a DRM engine as described below in FIGS. 6, 7 and 10–12 and exemplified by certain security aspects of the Wireless Application Protocol Identity Module specification (WIM) published by the Wireless Application Forum, Limited and dated Feb. 18, 2000 which is incorporated herein by reference in its entirety. The encrypted portion 9 of the license 7 contains a symmetric content key 13 and a set of binding attributes 15. The key 13 enables access to the corresponding content 1 while the binding attributes 15 relate to user identification data which will be elaborated upon below. Similarly, the encrypted portion 9 of the license 7 is manipulated by those external services required to manipulate the license and the corresponding content 1 such as those services provided by the DRM engine and exemplified by certain further security aspects of the aforementioned Wireless Application Protocol Identity Module specification. The encryption key pair, including public key 17 of a key pair used to protect the above-described encrypted portion 9 of the license 7, preferably utilizes asymmetric encryption techniques.

Figure 7:
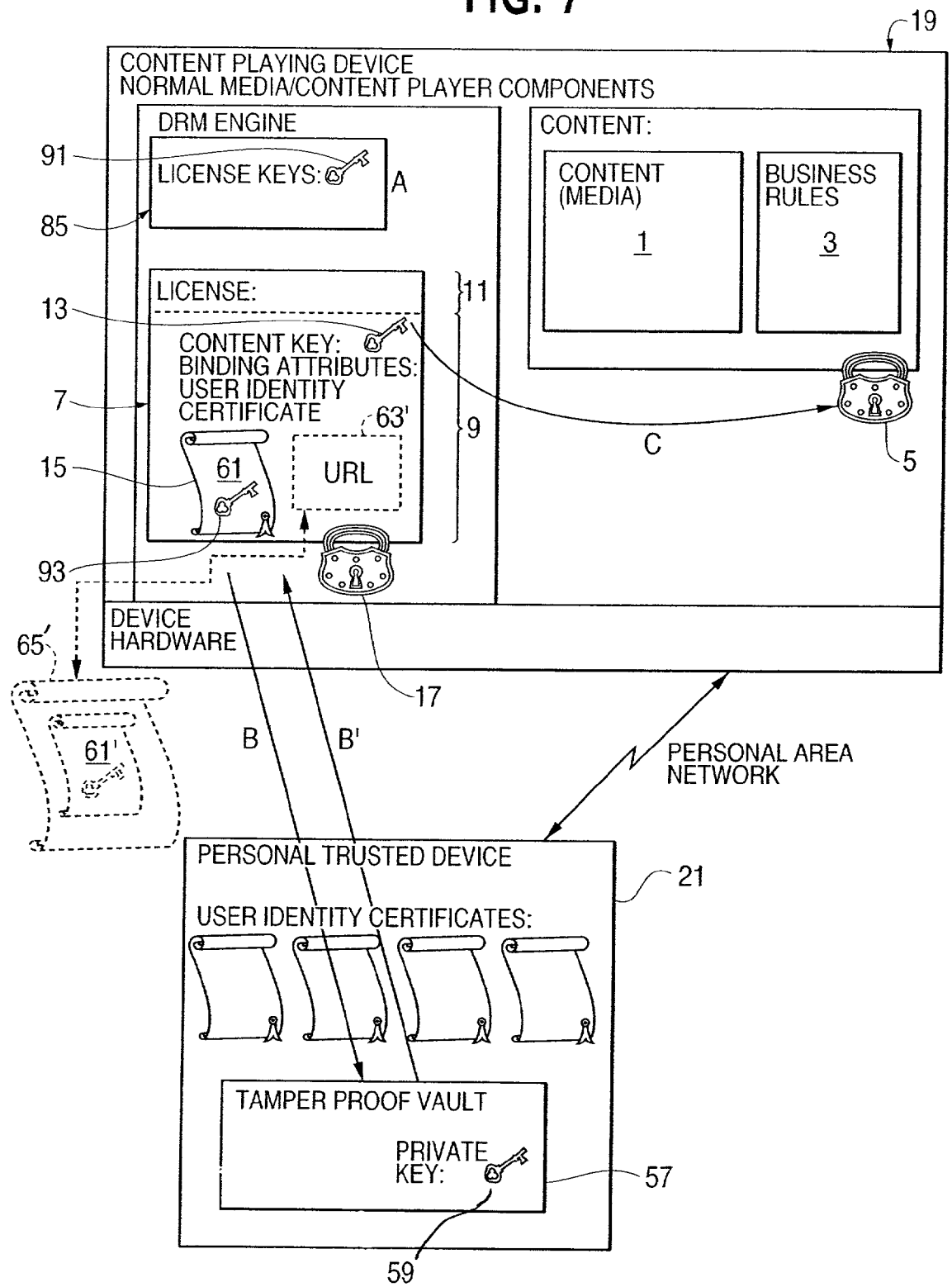
FIG. 7 is a schematic view of the system of FIG. 4.

With reference to FIG. 7, the public key 17 and the corresponding private key 91 are used to open the encrypted portion 9 at step (A) to access the symmetric content key 13 required at step (C) to unlock the encryption 5 of the content 1. The key pair comprising the public key 17 and private key 91 protecting the encrypted license portion is generated by or on behalf of a content provider and remains under the content provider's control. In particular, the content provider is able to control to whom the license 7 is delivered. Typically, delivery of the license 7 will be contingent on payment of an appropriate fee or the like.

Figure 4:
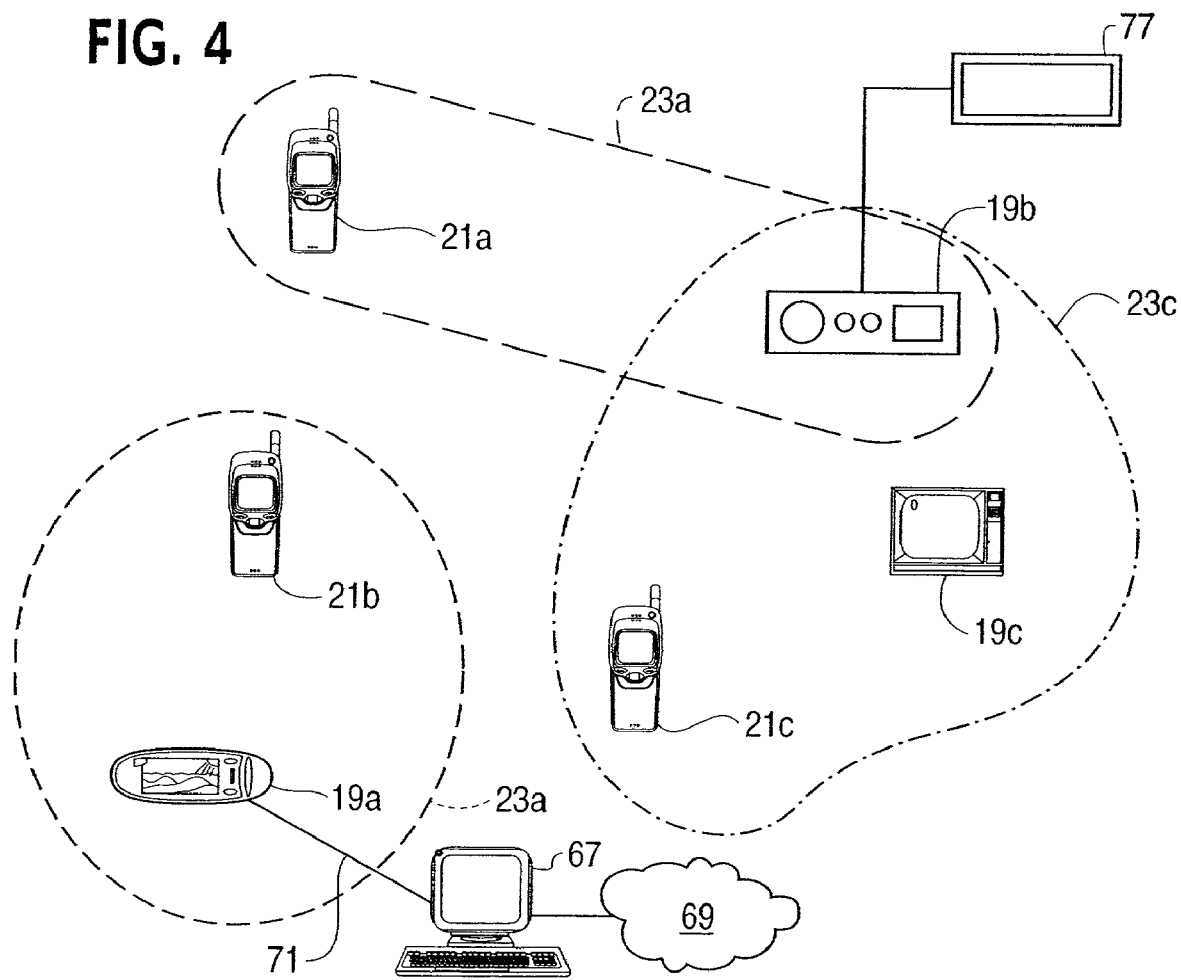
FIG. 4 is a schematic view of a content rendering system according to a further aspect of the present invention.

With reference to FIG. 4, there is shown a plurality of content rendering machines 19*a*, 19*b*, 19*c* and a number of Personal Trusted Devices (PTD) 21*a*, 21*b*, 21*c*. The plurality of content rendering machines 19*a*, 19*b*, 19*c* includes both portable and fixed equipment. In addition, the rendering machines 19*a*, 19*b*, 19*c* need not be of the same ownership as any or all of the PTDs 21*a* 21*b*, and 21*c*.

Each PTD 21*a*, 21*b* and 21*c* has a networking capability used to communicate with a rendering machine. Typically, such a capability is provided by a Personal Area Network (PAN) through the provision of one or more technologies from the following non-exhaustive list, namely wireless connectivity such as Infra Red, Low Power Radio Frequency (LPRF) such as e.g. Bluetooth and wired connectivity such as parallel port, serial port, USB, IEEE 1394 and the like. The extent of each PAN is shown by respective chain lines 23*a*, 23*b*, 23*c*. The PAN may overlap as shown. The PAN capability is interfaced with the known functionality of a mobile terminal as is well known to those skilled in the art.

Figure 5:
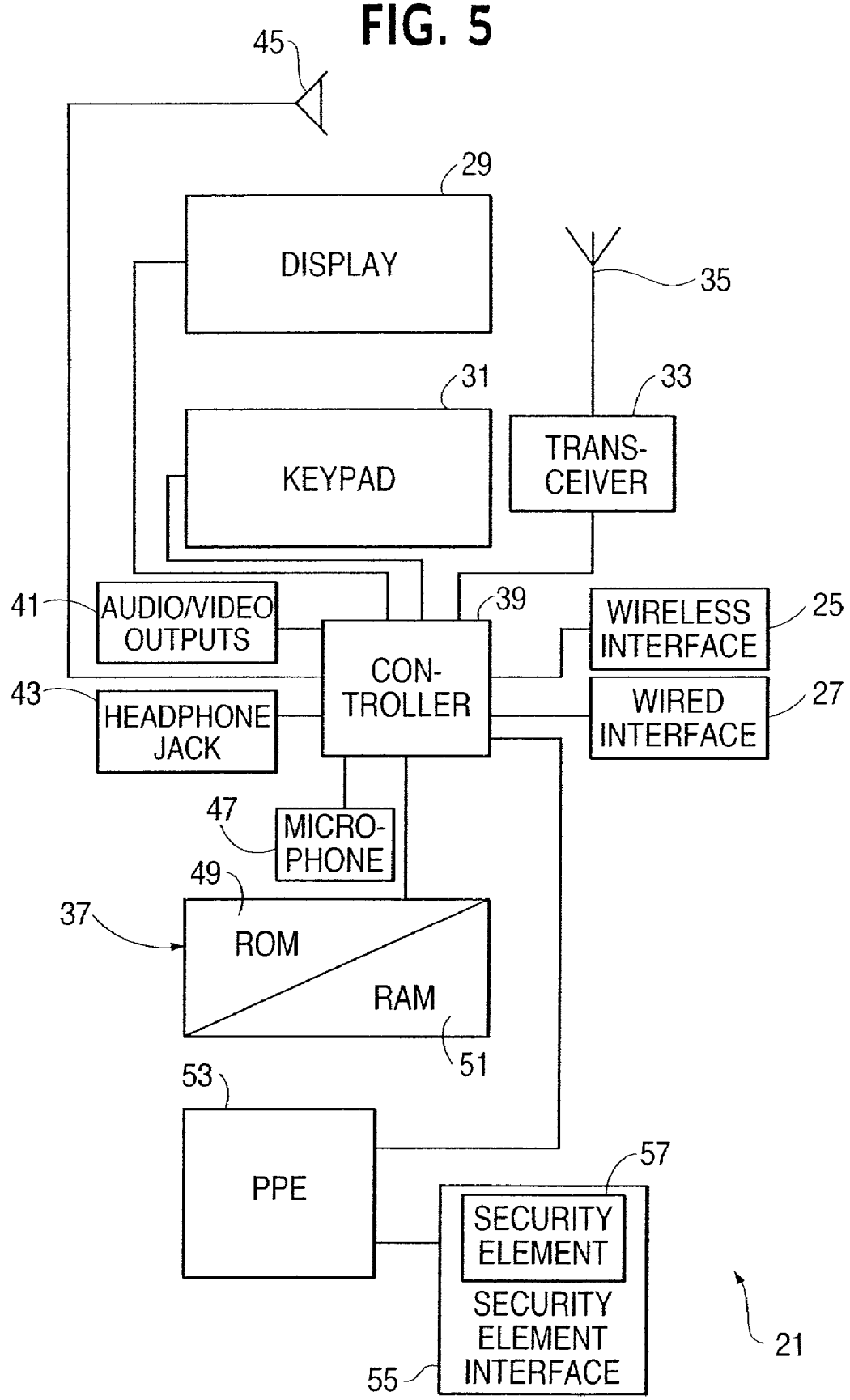
FIG. 5 is a diagrammatic view of a personal trusted device of FIG. 4.

Referring to FIG. 5, each of the PTDs 21*a*, 21*b* and 23*c* includes a display 29, a data entry device such as a keypad 31, a transceiver 33, an antenna 35, a general memory 37, a controller 39 and the aforementioned connectivity provided by a wireless interface 25 and wired interface 27. In addition, the PTD 21 is provided with audio/video outputs 41 as well as a headphone jack 43, a speaker 45 and a microphone 47. The general memory 37 includes Read Only and Random Access portions (ROM and RAM) 49 and 51 respectively and provides storage for the code necessary to implement the PAD 21 functions and storage for data which has been generated, received or otherwise utilized by the PTD 21 except to the extent that the function is carried out by or relates to a Protected Processing Environment (PPE) 53. The operation of the mobile telephone functions of the PTD in relation to a wireless network is, of course, well understood by those skilled in the art and is therefore herein not described.

The PPE 53 of the PTD 21 implements the functions required to provide authentication through a set of services including providing digital signatures and as exemplified by the aforementioned Wireless Application Protocol Identity Module specification (WIM). In addition to the connection to the controller 39, the PPE 53 is connected to a Security Element Interface 55 providing a secure access channel to a tamper resistant storage module, hereinafter referred to as a Security Element (SE) 57. The SE 57 holds private keys, certificates and other personal data belonging to a user. The SE 57 inhibits access to the data stored therein by a combination of well-known physical and software barriers. The SE (vault) 57 facilitates the storage of a private key forming part of an asymmetric key pair owned by the SE 57 owner which in the event the SE 57 is not a permanent component of the terminal 21 will most probably, but not necessarily, correspond to the owner of the terminal 21 in which the SE 57 is installed.

Referring to FIG. 7, the corresponding public key 93 is made available to third parties as a constituent of a user identity certificate 61 issued and digitally signed by a certification authority (CA). For convenience of access, the certificate 61 is stored on a repository (not shown) to which a content provider, amongst others has reading privileges.

The rendering machines 19*a*, 19*b* and 19*c* of FIG. 4 each have a general architecture shown in FIG. 6 and may have the more specific DRM architecture explained below with reference to FIGS. 10–12. As illustrated in phantom in FIG. 7, the user identity certificate 61 in the terminal may alternatively be replaced by storage of a URL 63' which is the address in a network at which the identical user identity certificate 61' may be fetched when the user identity certificate 61 is not present in the terminal. The network location 65' at which the user identity certificate 61' may be fetched in any location in any network from which data is available.

Each rendering machine 19, therefore comprises hardware including a controller 73 and a PAN interface utilizing at least one connectivity option including wireless connectivity 63 such as IR and LPRF and wired connectivity 65 such serial, parallel, USB, IEEE 1394 and the like. In addition to the functions set forth below, the PAN interfaces permit the delivery of encrypted content and/or licenses to the rendering machine 19. For example, as illustrated in FIG. 4, a USB cable 71 may be attached between a portable rendering machine 19*a* and a PC 67 having a connection to the Internet 69 or an internal CD drive. Encrypted content, such as music, may then be delivered over the cable 71 and stored in the rendering machine 19*a* for later enjoyment provided the necessary license conditions are met for rendering the content.

Figure 6:
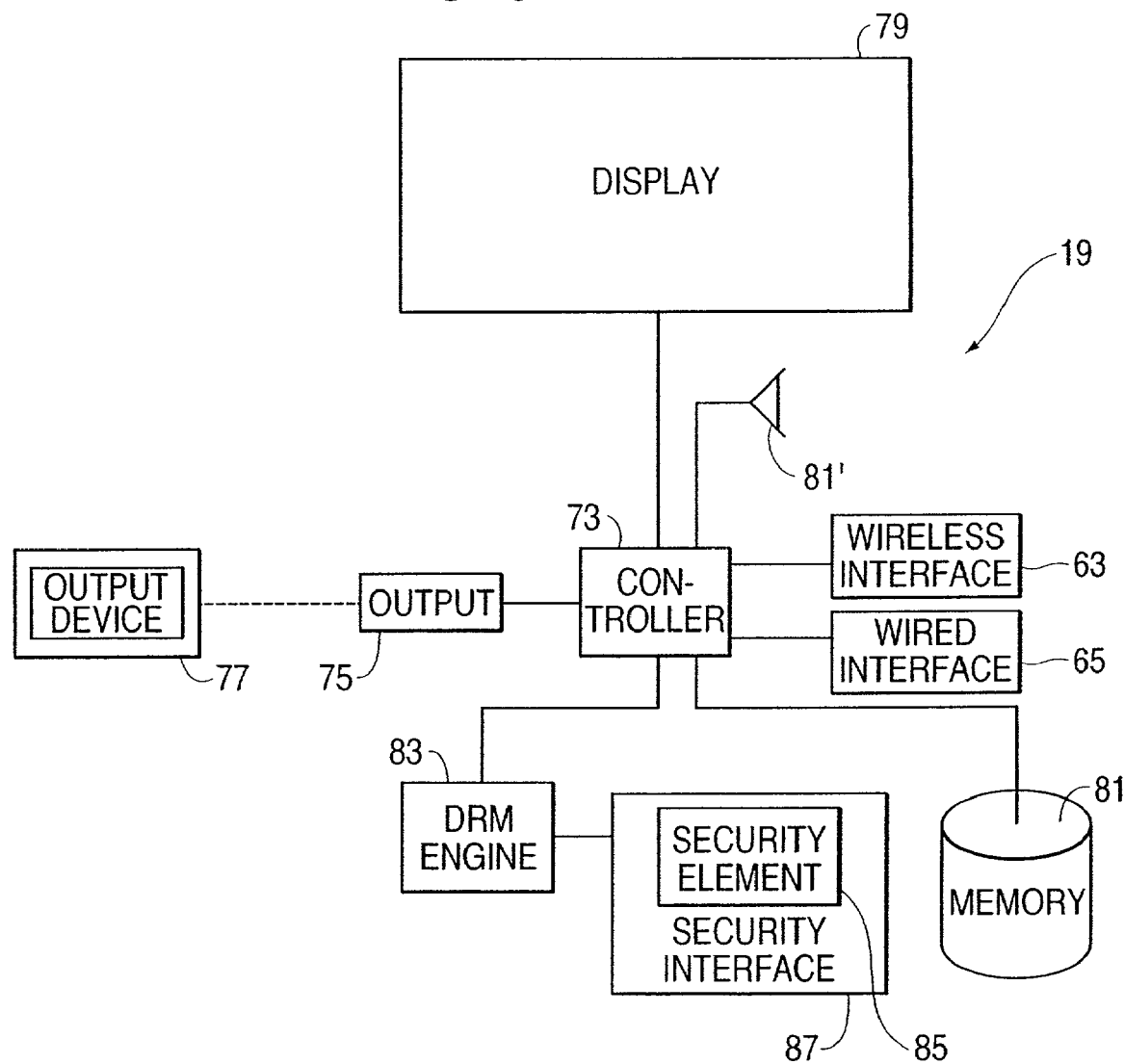
FIG. 6 is a diagrammatic view of a rendering machine of the system of FIG. 4.

If the rendering machine 19 relies on addition external components to deliver rendered content to a user, then a suitable output 75, illustrated in FIG. 6, is provided for delivering rendered content to an output device 77, such as a monitor, audio amplifier, or the like. Alternatively, the rendered content is output through a display 79 and loudspeaker 81'. In addition to the connectivity 63 and 65, the device 19 further includes a storage in the form of memory 81 provided to accommodate the large volume of data necessary to store encrypted content in the form of video and audio data files, for example. The rendering machine 19 further incorporates a Digital Rights Management (DRM) engine 83 which is connected to a Security Element (SE) 85 via a security element interface 87. An embodiment of a DRM, including a DRM engine and a DRM agent in a PPE which is highly resistant to tampering is described below in conjunction to FIGS. 10–12. Referring to FIG. 7, the SE 85 stores at least one license private key 91 necessary to decrypt the license 7, a portion of which is encrypted using the corresponding public key 17 of the license public-private key pair. As will be described further below, the DRM engine 83 administers the usage of content based on the aforementioned licenses distributed by the content provider. Such functionality includes the ability, expanded upon below, by which an identity of a user is verified.

Referring again to FIG. 7, the SE 85 of the rendering engine 19 has the private license key 91 of a content provider already installed thereon which may be used subsequently at step (A) to decrypt licenses 7 delivered to the rendering machine 19, that are encrypted with the corresponding public key 17 of the content provider. In due course, a user of the rendering machine 19 may choose to have the encrypted content 1 delivered to the device 19 at which the encrypted content is stored in memory 81. In order to decrypt the content 1 and subsequently render it to the user-licensee, an appropriate license 7 must be obtained from the content provider. Such a license 7 is delivered with the content 1 or obtained separately over a different channel and/or at different time.

The license 7 contains a set of binding attributes 15. The attributes 15 are required to ensure that only a user (licensee) party authorized by the content provider extracts the symmetrical key 13 required to decrypt the encrypted content 1 from the license.

Typically, delivery of the licenses 7 by the licensor takes place after consideration of some form has been provided by the licensee. Such consideration could be monetary or it could relate to a commitment to maintain confidentiality in respect of the content. The particular nature of the consideration, if any, will depend on the particular circumstances and methods of implementation which vary widely.

The binding attributes 15 are provided in the form of a Public Key Infrastructure (PKI) user certificate 61 which is representative of the licensee identity. The certificate 61 contains a public key 93 of the licensee which is preferably digitally signed by a Certification Authority (CA). In an initial step of the licensing process, the licensor may assess the extent of trust of the certificate of a potential licensee and this may include a determination of the level of trust in the CA and, of course, whether the certificate has been appropriately signed.

Figure 8A:
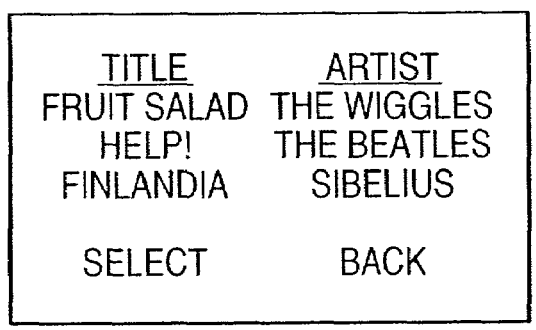
FIGS. 8a to 8d are examples of screen displays of the rendering machine of FIG. 6.

With additional reference to FIGS. 8*a* to 8*d*, the user of the rendering machine 19 first selects the encrypted content which the user desires to have rendered. Thus, via a user interface (UI), a list of encrypted content is displayed on the display (FIG. 8*a*). The user selects an encrypted content item from the list and the UI passes an instruction to the controller 73 which in turn is passed to the DRM engine 83. The DRM engine 83 of the rendering machine 19 first searches for a license 7 corresponding to the content for which a request to render has been received by the UI.

Figure 8B:
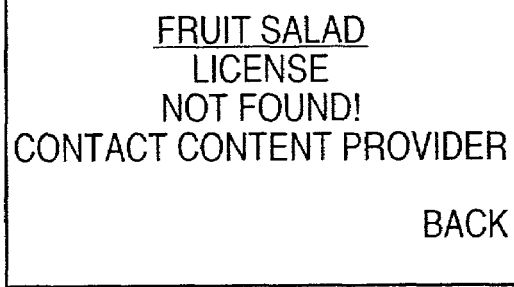

Thus, the DRM engine 83 attempts to match the identity of the encrypted content 1 with the licensee identity data in the exposed portion 11 of any license stored on the device 19. In the event, no license can be found, the DRM engine 83 communicates this to the controller 73 which causes the UI to display an error message on the display (FIG. 8*b*). Otherwise, the DRM engine 83 utilizes the licensee's private key 91 at step (A) to unlock the encryption surrounding the content key 13 and binding attributes 15. However, before the content key 13 is extracted during decryption at step (C), the DRM engine 83 first accesses the binding attributes 15, namely the user certificate 61. The user certificate 61 contains a public key 93 of a user to whom a license has been given to render the content 1. The DRM engine 83 instructs the controller 73 to commence by polling the local PTDs 21 forming a PAN 23 in which the rendering machine 19 is a member. The polling step (B) further contains the instruction to the PTDs 21 within the PAN to digitally sign a randomly generated text with a private key 59 stored in the PTDs SE 57 and returns at step (B'). The randomly generated text and corresponding signature is the response to the poll from the rendering machine 19.

Figure 8C:
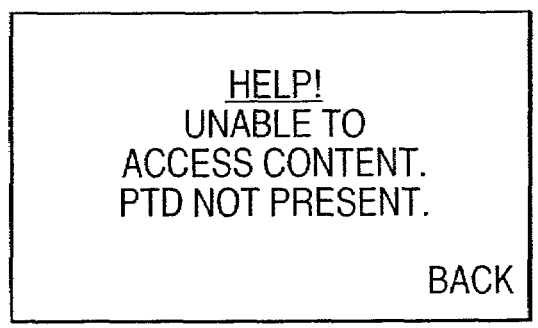
Figure 9:
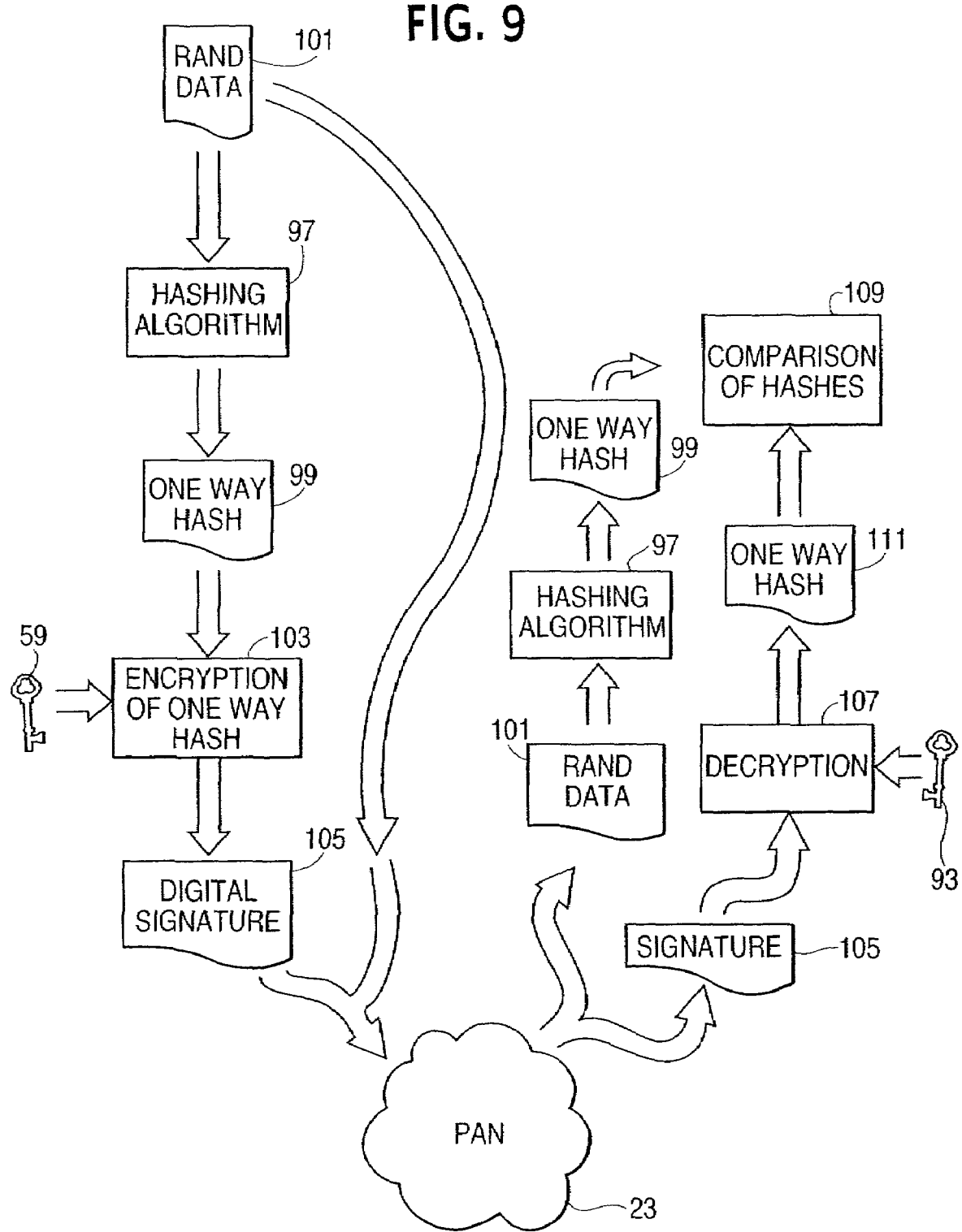
FIG. 9 is a flow chart illustrating a method according to a still a further aspect of the present invention.

FIG. 9 illustrates the above process in more detail. A hashing algorithm 97 generates a one-way hash 99 of a particular part of randomly generated RAND data 101 and then encrypts the one-way hash 99 at step 103 utilizing the user private key 59 stored in the SE 57 to form a digital signature 105. The signature 105 and corresponding randomly generated text 101 is received via each device within the PAN 23 and the DRM engine of the rendering machine 19. Thus, the DRM engine 83 takes the randomly generated RAND data 101 returned from each device 21 and processes the randomly generated RAND data with the same hashing algorithm 97 to form a one way hash 99. This hash 99 is compared at 109 with the results of the decryption 107 of the corresponding signature 105 carried out utilizing the public key 93 stored in the certificate 61 forming the binding attributes 15, namely a further one way hash 111. In the event that the hashes 99 and 111 are not identical, then this is an indication that the public key of the certificate is not the pair of the user private key on that PTD 21. Thus, the DRM engine 83 does not permit the extraction of the symmetric key 13 necessary to decrypt the encrypted content 1. Subsequently, if no other PTD 21 has responded to the polling step (B), then the DRM engine 83 instructs the controller 73 to indicate via the UI that the content cannot be accessed. Thus, a message to this effect is delivered on the display via the UI (FIG. 8*c*). However, where further devices 21 have responded to the polling step (B), the process of creating a one way hash 99 of the received random data 101 and comparison with the one-way hash 111 derived by decrypting 107 the digital signature 105 using the certificate public key 93 is repeated.

Figure 8D:
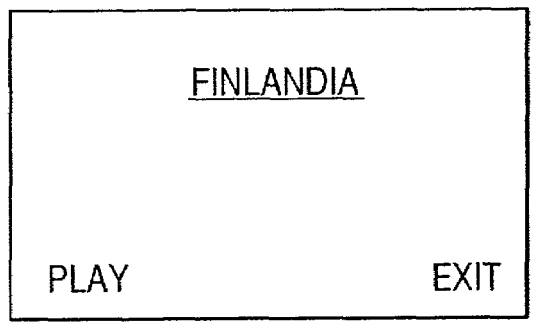

In the event that the decrypted one way hash 111 corresponds to the one way hash 99 formed from the random data 101, then the DRM engine 83 is assured that the PTD 21 is established as being in the possession of the user identity licensed to render the content 1. Consequently, the DRM engine 83 permits the content key 13 to be extracted and used to decrypt the content 1. This includes decrypting the business rules 3 associated with the content 1 which may further determine what actions may be carried out in relation to the content 1 by the user. The successful decryption and any associated rules relating to use of the content are delivered to the display of the rendering machine (FIG. 8*d*).

Figure 10:
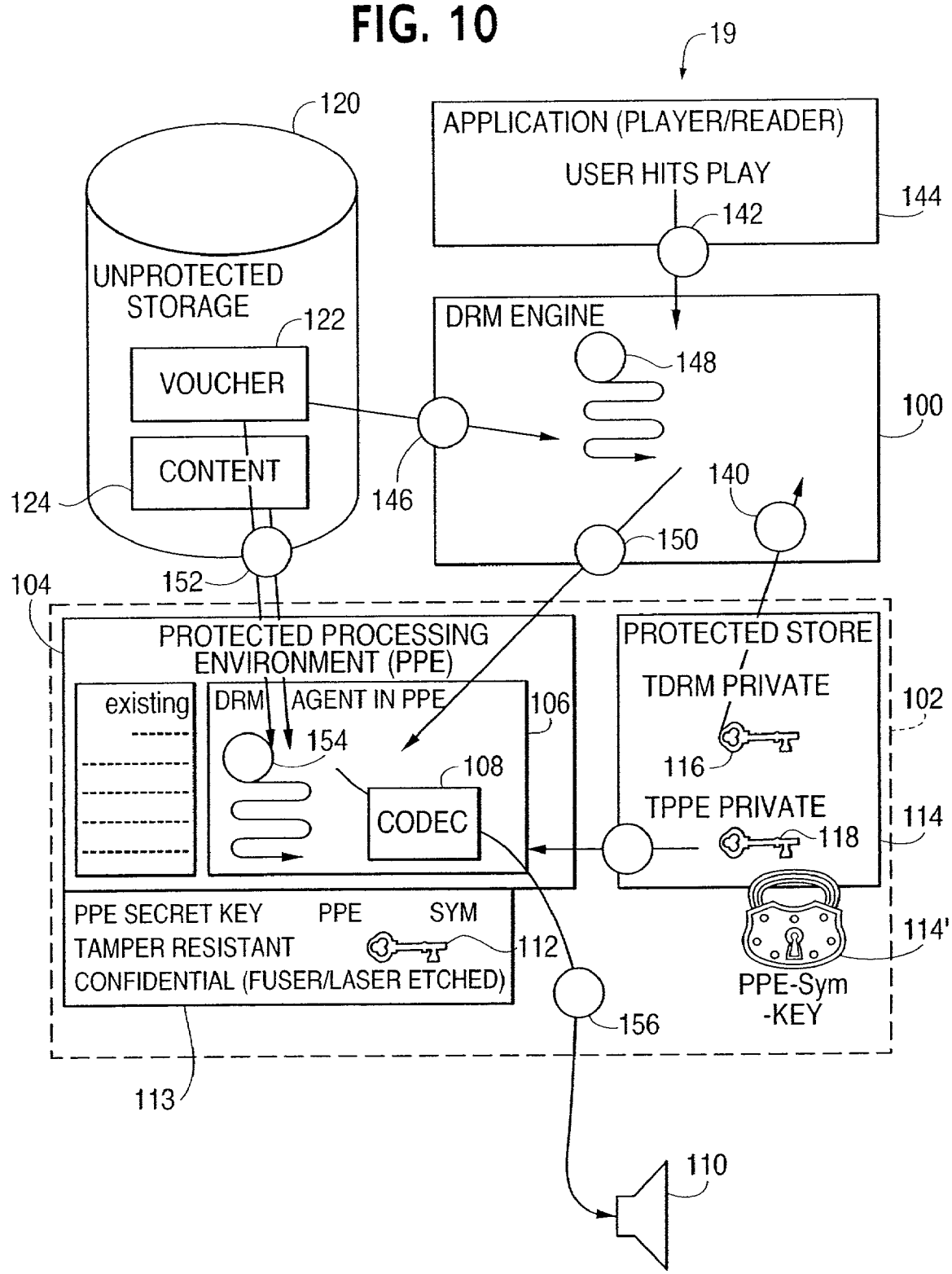
FIG. 10 is a diagram of an embodiment of a rendering machine having high security against obtaining the encrypted content stored therein without appropriate authority which does not require substantial data storage capability.
Figure 11:
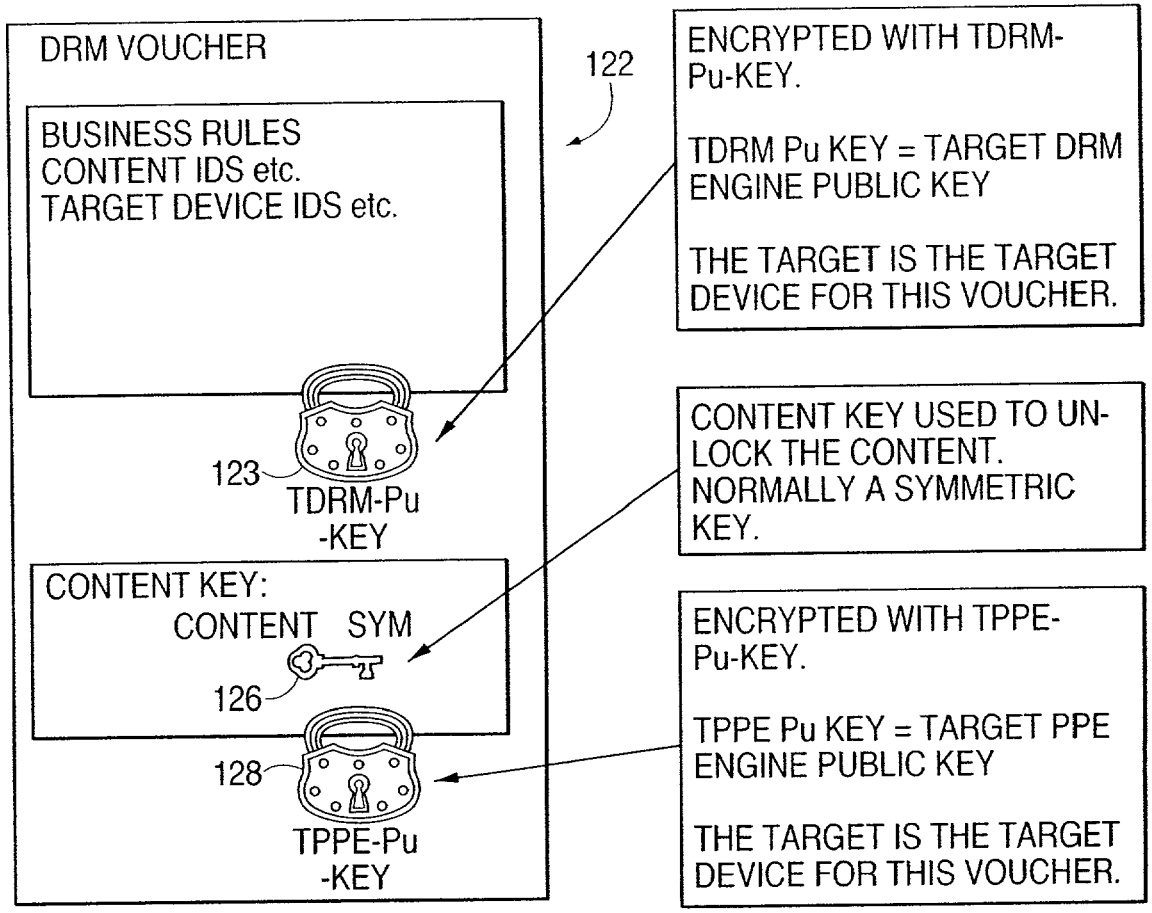
FIG. 11 illustrates one form of a voucher stored in the unprotected storage of FIG. 10.
Figure 12:
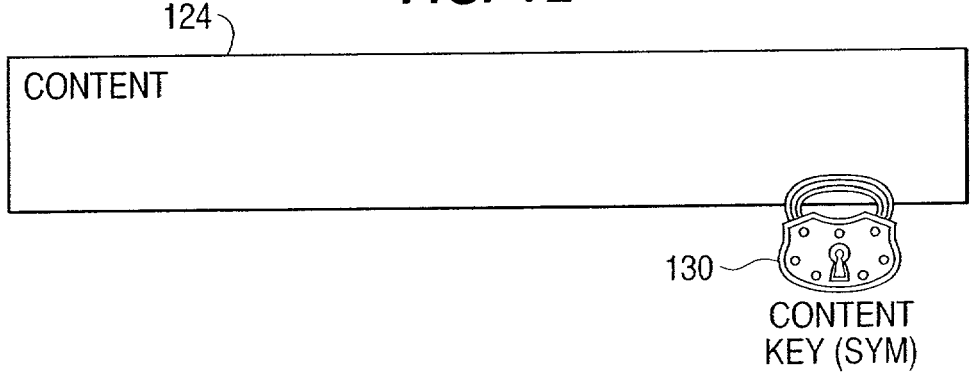
FIG. 12 illustrates one form of the content stored in the unprotected storage of FIG. 10.

FIGS. 10–12 illustrate an embodiment of the DRM engine which is split into two parts which is designed to minimize data storage. The DRM engine 100 is unsecured and the DRM agent 102 is secure as a result of being located in a PPE 104. CODEC 108 provides analog signals to speaker 110. A PPE symmetrical secret key 112 is located in a tamper resistant container 113 which may be fused/laser etched. Additionally, a PPE symmetrical key 114' is associated with a protected store 114 within the PPE 104 which contains a target TDRM private key 116 associated with the DRM engine 100 and a target private key TPPE 118 associated with the PPE 104.

The unprotected storage 120 stores a voucher 122, for example, as illustrated in FIG. 11 and encrypted content 124 as, for example, illustrated in FIG. 12.

With reference to FIG. 11, the DRM voucher 122 includes business rules, content identifications and target device identifications in the same manner as discussed above with respect to FIG. 7. The business rules, content identifications and target device identifications are encrypted with a TDRM public key 123. The target TDRM public key 123 is the DRM engine public key and the target is the target device for the voucher. The content key 126 is used to unlock the content and is normally a symmetrical key. The content key 126 is encrypted with a target TPPE public key 128 which is the target PPE engine public key and the target device is the target device for the voucher.

The content 124 illustrated in FIG. 12 is encrypted with a content key 130 which is typically a symmetrical key.

The PPE may include additional hardware allowing bootstrapping in a secure manner and may include a verifying signed code. The PPE has control of a memory managing unit (not illustrated) to restrict access to certain areas of the memory during operation.

The CODEC 108 may be disposed outside the application specific integrated circuit (ASIC)/CPU and furthermore, the output data from the CODEC may be from pins at the center of the integrated circuit making access thereto physically difficult. Furthermore, the output lines may run through a center layer of a multi-layered printed circuit board to provide additional protection to unauthorized access. As a result of the location exterior to the ASIC, the CODEC 108 may be removed from the PPE to permit change during the lifetime of the device.

The PPE 104 includes its own tamper-proof key 112 and includes a secure area for using the protected key making it a secure platform. As a result, the DRM engine 100 functions as a remote control of the DRM agent 106 in the PPE for reproduction of the content 124. This architecture has the advantage that the content 124 is only unprotected inside of the PPE 102 which strongly guards against theft. Therefore, even if the DRM engine 100 is unintentionally or maliciously compromised, all that can be accomplished is to play the content against the business rules within the voucher 122. Moreover, if a DRM engine attack is successful on one terminal, it does not break all of the terminals.

The operation of the terminal 19 in FIG. 10 to play back the content 124 is as follows. The first step 140 is when the private keys 116 and 118 in the protected store 114 are respectively used to initialize the DRM engine 100 which is unprotected except for its own tamper proof schemes and the DRM agent 106 in the PPE 104. The play message step 142 occurs when the user activates the application player reader 144 to play DRM protected content, such as music. The play message 142 is sent to the DRM engine 100. The voucher 122 is loaded at step 146 into the DRM engine 100 for the content 124 in the unprotected storage 120 which is to be reproduced. The DRM engine 100 next, at step 148, decrypts the business rules within the voucher 122 to determine if the requested usage is permitted. The DRM engine 100 does not and cannot decrypt the content as it is protected by the TPPE public key (not illustrated), which is contained in the DRM agent 106. Assuming that the business rules are verified by the DRM engine processing 148, at step 150 the DRM agent 106 in the PPE is signalled so that it is considered by the DRM agent to be authorized to play the content 124 which may be music, video, etc. At step 152, the DRM agent 106 in the PPE obtains the voucher 122 from the unprotected storage 120 and decrypts the content key therein using the TPPE private key 118. The DRM agent 106 then opens the content file in the unprotected storage. At step 154, the content stream is decrypted using the content key 126. Finally, at step 156, the decrypted content is processed by CODEC 108 where it is converted to analog and transmitted to the external reproduction device such as a speaker 110 when the content is audio.

The terminal of FIG. 10 has significant attributes. The content 124 is never in plain digital form outside the PPE 104. The DRM agent 106 in the PPE 104 functions as a decrypting system and contains much less software than putting the entire DRM engine 100 within the PPE. Unauthorized entry into the PPE is very difficult to accomplish. Finally, unauthorized entry into the DRM engine 100 is difficult and at worst, allows multiple playing on a given device, but does not compromise the entire system.

It will be appreciated by those skilled in the art that the functionality of the rendering machine set out above may be provided through software, hardware or any combination thereof.

While the present invention has been described in terms of its preferred embodiments, it should be understood that numerous modifications may be made thereto without departing from the scope of the present invention. It is intended that all such modifications fall within the scope of the appended claims.

The invention claimed is:

1. A method of decrypting encrypted content stored on a terminal, the method comprising the steps of:
   receiving a request to access encrypted content on a terminal;
   obtaining a license comprising a content decryption key and a set of binding attributes, the attributes including a public key of an authorized user of the encrypted content;
   in response to the request, polling a personal trusted device of said user to digitally sign data with a private key associated with the device;
   receiving said digitally signed data from said device;
   verifying at the terminal the digitally signed data utilizing the public key; and wherein the terminal in response to verification of the digitally signed data uses the content decryption key to decrypt the encrypted content;
   following said step of receiving said digitally signed data, applying a hashing algorithm to said data and decrypting said digitally signed data; and
   comparing results of said application of said hashing algorithm with said decrypted data in said step of verifying.

2. A method as claimed in claim 1, comprising: encrypting at least the content decryption key.

3. A method as claimed in claim 2, wherein: encryption is performed using a public key of an asymmetric key pair such that decryption of the content decryption key is carried out using a private key of the asymmetric key pair.

4. A method as claimed in claim 3, wherein: the private key is stored in a tamperproof and secure location.

5. A method as claimed in claim 4, wherein: the secure location comprises a security element.

6. The method of claim 1, wherein said personal trusted device is communicatively coupled with said terminal via a wireless interface.

7. The method of claim 6, wherein said wireless interface is a low power radio frequency interface.

8. The method of claim 1, wherein said terminal is a rendering machine, and said method further includes a step of rendering said decrypted content on said rendering machine.

9. The method of claim 1, further comprising the steps of:
receiving an identification of a user making said request; and
comparing said identification with a public portion of said license.

10. The method of claim 9, further comprising the step of accessing public portions of a plurality of licenses stored on said terminal to locate a license corresponding to said user.

11. The method of claim 1, wherein said personal trusted device is located proximate to the terminal, and wherein said polling uses a personal area network to instruct said personal trusted device to digitally sign test verification data with a private key of the authorized user stored in said personal trusted device.

12. The method of claim 1, wherein said polling transmits to two or more devices within a personal area network containing the terminal.

13. The method of claim 12, wherein said polling uses low power radio frequency transmission.

14. The method of claim 12, further comprising receiving polling responses from a plurality of devices located proximate to the terminal and connected to the personal area network.

15. A terminal for accessing encrypted content comprising:
a storage storing the encrypted content and a license, the license containing a content decryption key and a set of binding attributes, the attributes including a public key for a licensee of said content;
a digital rights management engine configured to:
receive a request to access said stored encrypted content from said licensee of said content;
generate identity verification data in response to said request;
establish, in response to said request, a communication link between the terminal and at least one other local terminal using a personal area network to request the other local terminal to encrypt and digitally sign the identity verification data, generated by said terminal, using a private key stored at the other local terminal and assigned to said licensee of said content, wherein said other terminal is a mobile telephone of said licensee;
receive said digitally signed identity verification data from said other local terminal;
use said public key to decrypt said encrypted identity verification data; and
analyze said decrypted data to verify that the private key stored at the other local terminal corresponds to the public key in the license, and upon successful verification, decrypt the encrypted content using the content decryption key.

16. A terminal as claimed in claim 15, comprising: a secure storage for a private key of an asymmetric key pair; and wherein the controller is further configured to decrypt at least the content decryption key, the content decryption key having been encrypted using a public key of the asymmetric key pair.

17. A terminal as claimed in claim 16, wherein: the storage is provided by a security element.

18. A terminal as claimed in claim 17, wherein: the digitally signed identity verification data is delivered to the storage.

19. A terminal as claimed in claim 16, wherein: the digitally signed identity verification data is delivered to the storage.

20. A terminal as claimed in claim 15, wherein: the digitally signed identity verification data is delivered to the storage.

21. The terminal of claim 15, wherein said identity verification data is a text string randomly generated by said other terminal.

22. The terminal of claim 15, further comprising:
a low power radio frequency interface, wherein said engine is further configured to use said low power radio frequency interface to establish said communication link with said other local terminal.

23. A method of decrypting encrypted content stored on a terminal, the method comprising the steps of:
receiving a request to access encrypted content on a terminal;
obtaining a license comprising a content decryption key and a set of binding attributes, the attributes including a public key of an authorized user of the encrypted content;
in response to the request, polling a personal trusted device of said user to digitally sign data with a private key associated with the device, wherein said personal trusted device is a mobile telephone;
receiving said digitally signed data from said device; and
verifying at the terminal the digitally signed data utilizing the public key; and wherein the terminal in response to verification of the digitally signed data uses the content decryption key to decrypt the encrypted content.

24. A digital rights management system, comprising:
a rendering terminal, said rendering terminal including:
a memory storing encrypted content and a license, said license including an exposed identity of a licensee to said content and an encrypted decryption content key;
a processor configured to receive a request to access said content and, in response to said request, perform the following:
transmit a polling request to a personal area network local to the terminal, said polling request requesting that a terminal receiving the request digitally sign test verification data using a private key stored on said terminal, said private key being assigned to said licensee;
receive a response to the polling request and determine whether said licensee is within a range of said personal area network, wherein said rendering terminal processor is further configured to generate said test verification data using a hashing algorithm; and
a mobile terminal, said mobile terminal including:
a memory storing a private key assigned to said licensee; and
a controller configured to receive said polling request and digitally sign said test verification data in response to said polling request.

25. The system of claim 24, wherein said rendering terminal processor is further configured to generate said test verification data randomly.

26. The system of claim 24, wherein said rendering terminal and said mobile terminal each include a low power radio frequency interface.

* * * * *